United States Patent
Grillenberger et al.

(10) Patent No.: US 6,835,161 B2
(45) Date of Patent: Dec. 28, 2004

(54) AUTOMATED CHANGE-SPEED GEARBOX AND METHODS FOR CHANGING GEAR IN SUCH A GEARBOX

(75) Inventors: Martin Grillenberger, Stuttgart (DE); Markus Heinzel, Donzdorf (DE); Michael Salecker, Stuttgart (DE); Friedo Tinschert, Ludwigsburg (DE); Dittmar Wieland, Oppenweiler (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/197,270

(22) Filed: Jul. 18, 2002

(65) Prior Publication Data
US 2003/0027683 A1 Feb. 6, 2003

(30) Foreign Application Priority Data
Jul. 19, 2001 (DE) .......................................... 101 35 327

(51) Int. Cl.[7] .............................................. B60K 41/28
(52) U.S. Cl. ........................................... 477/77; 477/84
(58) Field of Search .............................. 477/70, 77, 78, 477/83, 84, 86; 74/335, 336 R (56) References Cited

U.S. PATENT DOCUMENTS

| | | | | |
|---|---|---|---|---|
| 4,683,996 A | * | 8/1987 | Hattori et al. | 477/80 |
| 4,971,183 A | * | 11/1990 | Tellert | 477/86 |
| 5,072,815 A | * | 12/1991 | Jarvis | 477/85 |
| 5,593,363 A | * | 1/1997 | Asai et al. | 477/74 |
| 5,816,100 A | * | 10/1998 | Fowler et al. | 74/335 |
| 5,842,376 A | * | 12/1998 | Dresden et al. | 74/336 R |
| 6,258,009 B1 | * | 7/2001 | Thomas et al. | 477/109 |
| 6,530,861 B1 | * | 3/2003 | Nakashima | 477/85 |
| 6,551,213 B2 | * | 4/2003 | Suzuki | 477/111 |

FOREIGN PATENT DOCUMENTS

| | | |
|---|---|---|
| DE | 19859458 A1 | 6/1999 |
| EP | 0695665 B1 | 9/1998 |

* cited by examiner

Primary Examiner—Sherry Estremsky
(74) Attorney, Agent, or Firm—Crowell & Moring LLP (57) ABSTRACT

A method for changing gear in an automated change-speed gearbox of a motor vehicle with an automated clutch arranged between an engine and the change-speed gearbox includes engaging the clutch up to a slip limit during a downshift from an original gear to a target gear to increase the rotational speed of an input shaft of the change-speed gearbox.

18 Claims, 7 Drawing Sheets

AUTOMATED CHANGE-SPEED GEARBOX AND METHODS FOR CHANGING GEAR IN SUCH A GEARBOX

This application claims the priority of German Patent Document No. DE 101 35 327.8, filed Jul. 19, 2001, the disclosure of which is expressly incorporated by reference herein.

BACKGROUND AND SUMMARY OF THE INVENTION

The invention relates to methods for changing gear in an automated change-speed gearbox of a motor vehicle and to an automated change-speed gearbox.

EP 0 695 665 B1 describes a control system for a gearbox with a servo device, which is assigned to an engine of a motor vehicle. The control system has an actuating device, which can be actuated to select and disengage a gear, perform a gear selection, and engage and disengage a clutch. The engine has a first processing unit, which regulates the torque provided by the engine and the rotational speed of engine.

A second processing unit of the control system is suitable, in the case of a gear change from an original gear to a target gear, in particular during a downshift, for supplying control information to the first processing unit of the engine before the disengagement of the original gear to bring about a controlled reduction of the torque provided by the engine. Before the target gear is selected, the first processing unit supplies the second processing unit with further control information in order to bring a rotational speed of the engine to a given target value. During this process, the clutch is either closed for the entire time or it is opened before the original gear is disengaged and is completely closed after the original gear is disengaged.

DE 198 59 458 A1 discloses a gearbox in the form of a change-speed gearbox. The gearbox has a shiftable drive-away clutch arranged on the input side and additional clutches, in particular power-shift clutches, which engage gearwheels with a shaft. It also describes a method for changing from an original gear to a target gear, in particular for downshifting. The gear change is carried out without control of engine torque. After the start of shifting, a power-shift clutch is closed. When the power-shift clutch is transmitting the full torque, the original gear can be deselected. A gearbox input shaft is then brought to a higher target rotational speed. As soon as the target rotational speed has been reached, the target gear is selected. The drive-away clutch remains closed during the entire shift operation or is opened during the deselection of the original gear and the selection of the target gear.

In view of the prior art, it is an object of the present invention to provide an automated change-speed gearbox and methods for changing gear in such a gearbox, to provide smooth operation of the automated change-speed gearbox and particularly short shifting times for downshifts.

This object is achieved by the embodiments of the present invention described hereinafter.

In the case of a method according to the invention for shifting down from an original gear to a target gear, an automated clutch arranged between the engine and the change-speed gearbox is engaged up to, at most, a slip limit to increase the rotational speed of an input shaft of the change-speed gearbox.

During a downshift, the input shaft of the change-speed gearbox must be brought to a synchronization speed of the target gear, which is greater than the rotational speed of the input shaft in the original gear. The synchronization speed is achieved when a selector element of the target gear and a gearwheel of the target gear are at the same rotational speed. The input shaft is accelerated by a torque provided by the driving engine. For this purpose, the clutch arranged between the driving engine and the change-speed gearbox must transmit a torque. The clutch is engaged up to, at most, the slip limit by an actuator. The slip limit is reached when the clutch cannot transmit more than the torque applied and would thus slip if there were a very slight increase in the torque. It is particularly advantageous if the clutch is operated precisely at the slip limit. In this case, the rotational speed of the driving engine and that of the input shaft of the change-speed gearbox are identical.

This allows particularly smooth operation of the change-speed gearbox since torque peaks of the engine which occur are not transmitted to the change-speed gearbox. Moreover, torque surges, which are introduced from the road via driven wheels, are not taken by the driving engine but lead to slipping of the clutch.

In the method according to the invention for shifting down in an automated change-speed gearbox with just one automated clutch arranged between the engine and the change-speed gearbox, the clutch is at least partially disengaged to deselect the original gear. The change-speed gearbox does not have any other clutches, in particular power-shift clutches. To deselect the original gear and hence release a selector element of the original gear from a gearwheel of the original gear, only a very low torque must be transmitted from the selector element to the gearwheel or vice versa. The clutch can, for example, be opened only until the absolute value of the torque at the selector element of the original gear has undershot a threshold value. The torque at the selector element can be calculated by a control device that carries out the method according to the invention. Calculation can, for example, take place on the basis of the torque provided by the engine, the rotational speeds and the rotational-speed time derivative of the individual shafts in the change-speed gearbox and physical parameters, e.g. the mass moment of inertia, of individual components or sub-assemblies of the change-speed gearbox. The clutch can be disengaged by a ramp or by a predetermined characteristic or abruptly, for example.

The rotational speed of the engine is adjusted in the direction of the synchronization speed of the target gear simultaneously with the opening of the clutch. Adjustment can be accomplished by control and/or regulation of the rotational speed and/or of the torque provided by the engine. After the deselection of the original gear, the clutch is at least partially reengaged in order to match the rotational speed of the input shaft of the change-speed gearbox to the rotational speed of the engine and hence increase it.

This leads to particularly short shifting times for a downshift since the input shaft of the change-speed gearbox reaches the synchronization speed of the target gear particularly quickly, and the target gear can thus be selected particularly quickly. Any interruption in the tractive effort at the vehicle wheels during the shift is thus particularly short.

In addition, a considerable reduction in the cost of the change-speed gearbox is achieved by the elimination of power-shift clutches.

In another method according to the invention, the clutch is disengaged to deselect the original gear, ensuring torque can no longer be transmitted by the clutch. For the deselection of the original gear and hence for the release of a sector element of the original gear from a gearwheel of the original gear, only a very low torque must be transmitted from the selector element to the gearwheel or vice versa. If this is achieved by disengaging the clutch, the original gear can be deselected without the possibility that torque surges will be introduced into the motor vehicle. This allows smooth operation of the motor vehicle.

In yet another method according to the invention, the clutch is partially disengaged to deselect the original gear. The clutch is disengaged only until a selector element of the original gear can be disengaged.

In still yet another method according to the invention, the rotational speed of the engine is adjusted in the direction of the synchronization speed of the target gear simultaneously with the disengagement of the clutch. This allows particularly short shifting times since the engine and, after the partial engagement of the clutch, the input shaft of the change-speed gearbox, reach the synchronization speed in as short a time as possible. The target gear can thus be selected after a particularly short time.

In a further method according to the invention, the change-speed gearbox is embodied as a non-synchromesh (claw-type) shift gearbox. Change-speed gearboxes of this kind do not have synchronizing devices, e.g. synchronizer rings. For this reason, there must be approximate equality between the rotational speeds of a selector element of a gear to be selected and the gearwheel of the gear to be selected before the selector element is actuated by an actuator. In the case of downshifts, this can be achieved by the engine. In the case of upshifts, a gearbox brake can be employed or it is necessary to wait until equality between the rotational speeds is established due to friction in the change-speed gearbox.

Such gearboxes can be produced in a simple manner and with a small number of components compared with synchromesh shift gearboxes. This enables a gearbox of this kind to be produced at low cost.

In a yet further method according to the invention, adjustment of the rotational speed of the input shaft of the change-speed gearbox into a range around the synchronization speed of the target gear takes place in two phases. In the first phase, at the beginning of adjustment, the rotational speed rises very rapidly, i.e., the time derivative of the rotational speed is large. As soon as the difference between the synchronization speed and the rotational speed of the input shaft has undershot a threshold value, the second phase of adjustment begins.

In the second phase, the rotational speed of the input shaft no longer rises as sharply, i.e. the time derivative is smaller than in phase one. The rotational speed of the input shaft can thus be adjusted very accurately to the synchronization speed. As a result, the target gear can be selected without torque peaks being introduced into the vehicle. This leads to particularly smooth selection of the target gear.

In a still further method according to the invention, the clutch is engaged beyond the slip limit after the adjustment of the rotational speed of the input shaft of the change-speed gearbox into a range around the synchronization speed of the target gear. On completion of the gear change, the clutch must be fully reengaged in order to be able to transmit the torque of the engine. If engagement beyond the slip limit takes place already after the adjustment of the rotational speed of the input shaft of the change-speed gearbox into a range around the synchronization speed of the target gear and hence just before the selection of the target gear, the torque can be transmitted immediately after the selection of the target gear. This leads to a particularly short interruption of the tractive effort at the driven wheels.

In a still yet another method according to the invention, there is at least one further (intermediate) gear between the original gear and the target gear, the intermediate gear being selected in the case of a gear change from an original gear to a target gear. If the clutch is engaged up to, at most, the slip limit to increase the rotational speed of an input shaft of the change-speed gearbox, torque peaks that could occur during the selection of the intermediate gear are not taken by the driving engine. Instead, the clutch slips and the occupants of the vehicle cannot feel the torque peaks. This allows particularly smooth operation of the change-speed gearbox.

In another method according to the invention, the adjustment of the rotational speed of the input shaft of the change-speed gearbox into a range around the synchronization speed of the intermediate gear takes place in just one phase. The rotational speed of the input shaft is increased very quickly and the range around the synchronization speed is therefore reached after only a short time. This advantageously allows particularly short shifting times.

In an automated change-speed gearbox according to the invention, an automated clutch is arranged between the engine and the change-speed gearbox. The change-speed gearbox has a control device, which comprises at least one clutch control device that engages the clutch up to, at most, the slip limit during a downshift from an original gear to a target gear to increase the rotational speed of the input shaft of the change-speed gearbox.

Other objects, advantages and novel features of the present invention will become apparent from the following detailed description of the invention when considered in conjunction with the accompanying drawings.

DETAILED DESCRIPTION OF THE DRAWINGS

Figure 1:
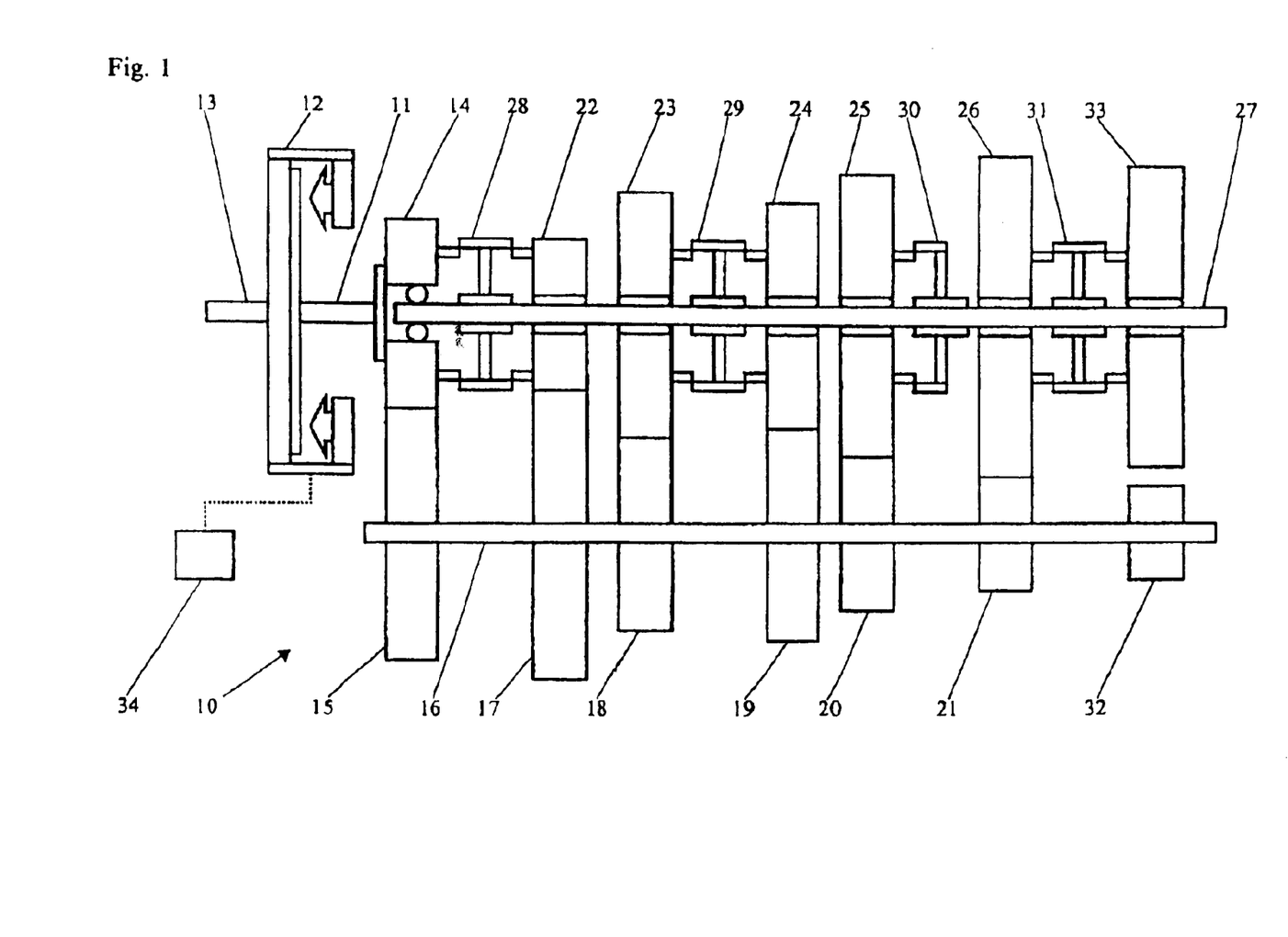
FIG. 1 shows a schematic representation of a change-speed gearbox with 6 forward gears and one reverse gear in the neutral position.

According to FIG. 1, a change-speed gearbox 10 has an input shaft 11, which can be coupled to a coaxially arranged output shaft 13 of an engine (not shown) with a clutch 12. The clutch 12 can be engaged and disengaged by an actuating device (not shown), which is activated by a control device 34. A gearwheel 14 is connected in a rotationally fixed manner to the drive shaft 11 and meshes with a gearwheel 15, which is connected in a rotationally fixed manner to a layshaft 16 arranged parallel to the input shaft 11. Fixed wheels 17, 18, 19, 20 and 21 for the sixth, third, fourth, second and first gear are arranged in a rotationally fixed manner on the layshaft 16. The fixed wheels 17, 18, 19, 20 and 21 each mesh with associated loose wheels 22, 23, 24, 25 and 26, which are arranged rotatably on a gearbox output shaft 27 arranged coaxially with the input shaft 11. Loose wheel 22 can be connected to the gearbox output shaft 27 in a rotationally fixed manner by a sliding sleeve 28, loose wheels 23 and 24 can be connected to the gearbox output shaft 27 in a rotationally fixed manner by a sliding sleeve 29, loose wheel 25 can be connected to the gearbox output shaft 27 in a rotationally fixed manner by a sliding sleeve 30, and loose wheel 26 can be connected to the gearbox output shaft 27 in a rotationally fixed manner by a sliding sleeve 31. For this purpose, the sliding sleeves 28, 29, 30, 31 can be moved axially within certain limits on the gearbox output shaft 27 by an actuating device (not shown), which is activated by the control device 34. The actuating device can be designed as a gear selector drum, for example.

When the fourth gear is selected, for example, loose wheel 24 is connected to the gearbox output shaft 27 in a rotationally fixed manner by the sliding sleeve 29. The rotational speed and torque of the engine is then transmitted to the gearbox output shaft 27 via the output shaft 13, the clutch 12, the input shaft 11, gearwheels 14 and 15, the layshaft 16, fixed wheel 19, loose wheel 24 and sliding sleeve 29. The rotational speed and torque are transmitted from the gearbox output shaft 27 by a drive shaft (not shown) to a final drive (not shown), which transmits the torque in equal or different proportions to driven wheels (not shown) via two driven shafts (not shown) in a known manner.

In the fifth gear, gearwheel 14 and hence the input shaft 11 are connected directly to the gearbox output shaft 27 by the sliding sleeve 28. The reverse gear is formed by bringing a fixed wheel 32 arranged in a rotationally fixed manner on the layshaft 16 into operative connection with a loose wheel 33 arranged rotatably on the gearbox output shaft 27 by a sliding wheel (not shown). In addition, loose wheel 33 is connected to the gearbox output shaft 27 in a rotationally fixed manner by sliding sleeve 31.

Figure 2A:
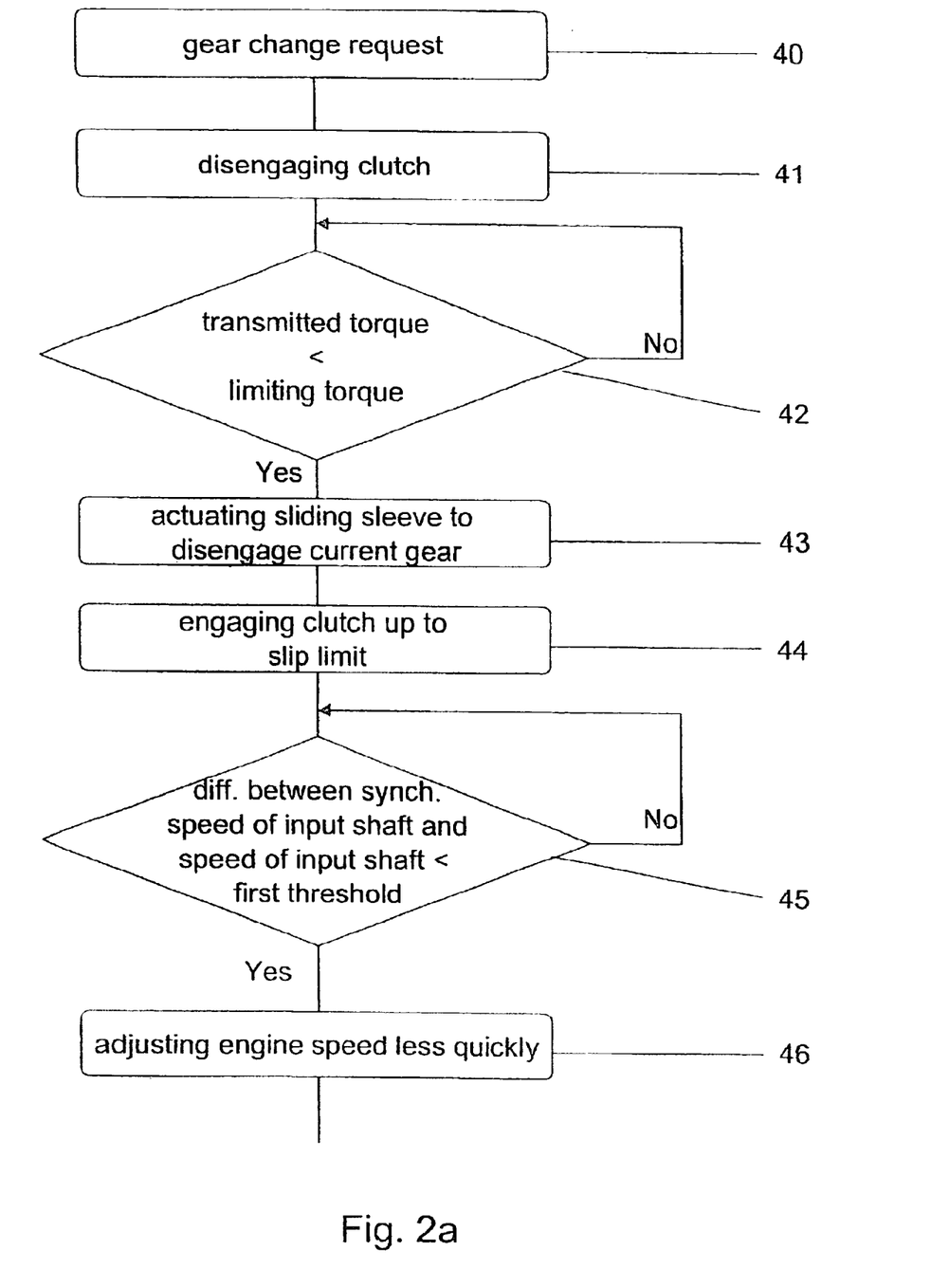
FIGS. 2a and 2b show a block diagram of a control program for a downshift from an original gear to a target gear.
Figure 2B:
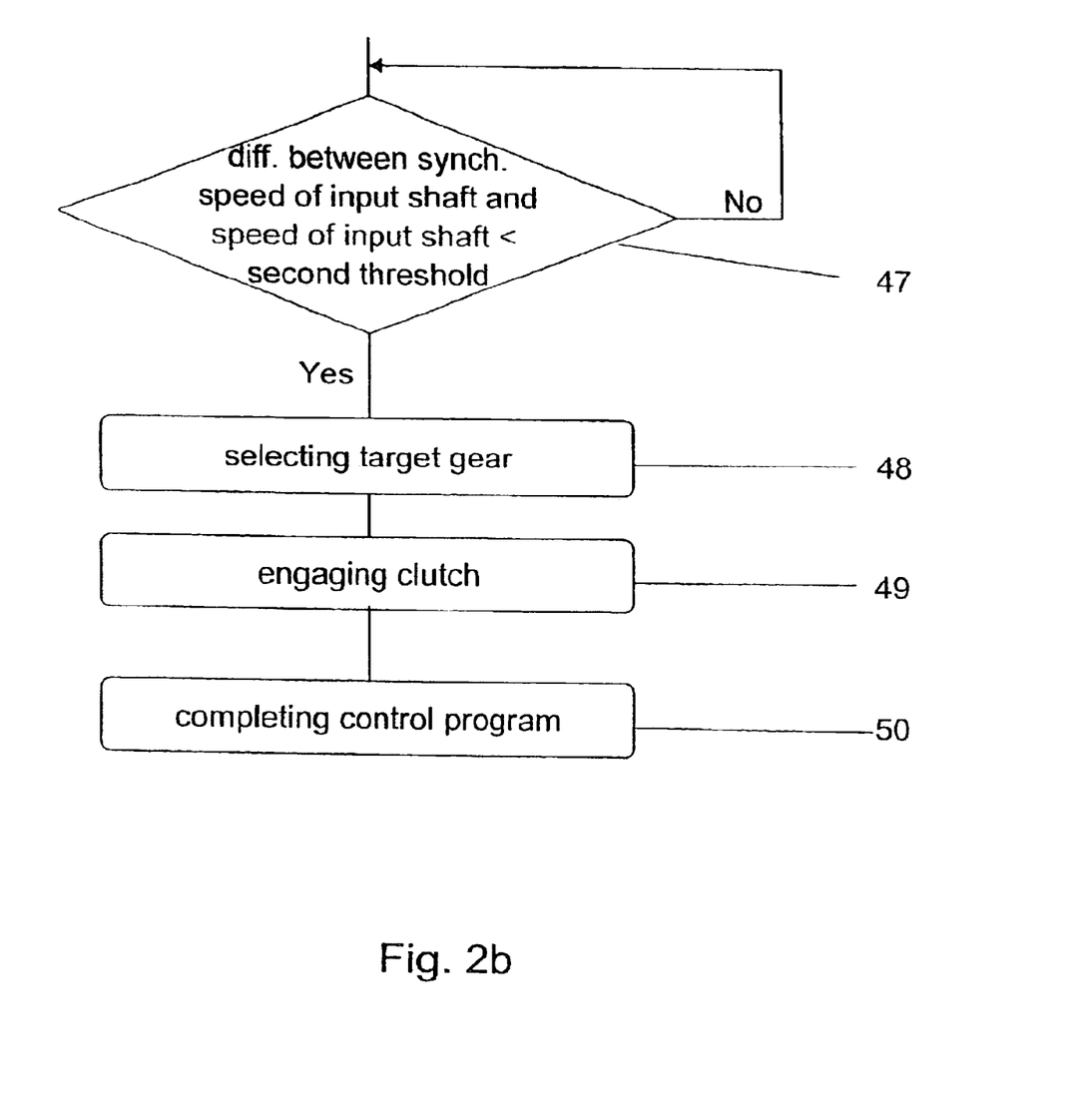

FIGS. 2a and 2b show a block diagram of a control program for a downshift by one gear from an original gear to a target gear. The control program is executed by the control device 34 in FIG. 1, which activates the actuating devices for the clutch 12 and the sliding sleeves 28, 29, 30, 31.

In block 40, the control program is started by a gear-change request for shifting to a target gear. The gear-change request is generated either by a driver of the vehicle, by a suitable operating device, or by the control device 34 on the basis of state variables of the motor vehicle, e.g. road speed, acceleration or rotational speed of the driving engine.

In block 41, disengagement is started by a ramp of the clutch 12. As a result, the input shaft 11 of the gearbox 10 is separated from the output shaft 13 of the engine in stages, and the transmissible or transmitted torque falls, and the torque transmitted between the loose wheel and the sliding sleeve of the original gear also falls. Moreover, the control device 34 determines from a rotational speed of the gearbox output shaft 27 and a transmission ratio of the target gear the synchronization speed of the target gear, to which the input shaft 11 must be accelerated. Immediately after this, a control device of the engine is made to adjust the rotational speed of the engine to the synchronization speed of the target gear as fast as possible in a first phase. The torque provided by the engine is thus not reduced.

In block 42, the torque transmitted between the loose wheel and the sliding sleeve of the original gear is first of all determined on the basis of appropriate variables, e.g. the torque provided by the engine, the transmissible torque of the clutch 12, the rotational speeds and rotational-speed time derivative of the output shaft 13, the input shaft 11 and the gearbox output shaft 27, and the moment of inertia of individual components or subassemblies. The system then checks whether the magnitude of the transmitted torque is less than a limiting value. If the result of the check is negative, block 42 is repeated until the result of the check is positive, and the control program is continued with block 43.

In block 43, the actuating device that actuates the sliding sleeves 28, 29, 30, 31, is activated to release the sliding sleeve of the original gear from the loose wheel of the original gear. For this purpose, the sliding sleeve is pushed off the loose wheel in the axial direction of the gearbox output shaft 27, and the loose wheel is rotatable once more relative to the gearbox output shaft 27. The original gear is thus deselected.

In block 44, the actuating device of the clutch 12 is activated to engage the clutch 12 up to a slip limit. The degree of engagement is determined by the control device 34 on the basis of appropriate variables, e.g. the torque provided by the engine, the rotational speeds and the rotational-speed time derivative of the output shaft 13, the input shaft 11 and the gearbox output shaft 27, and the moment of inertia of individual components or subassemblies. A torque is thus transmitted from the output shaft 13 of the engine to the input shaft 11 of the gearbox 10, and the rotational speed of the input shaft 11 is increased.

In block 45, the system checks whether the difference between the synchronization speed of the target gear and the rotational speed of the input shaft 11 is less than a first threshold value. If the result of the check is negative, block 45 is continued until the result of the check is positive, and the control program is continued in block 46.

In block 46, the control device of the engine is made to abort the first phase involving rapid regulation of the rotational speed of the engine, which was active during blocks 42, 43, 44 and 45, and to start a second phase of regulation. In this second phase, the rotational speed of the engine is adjusted to the synchronization speed of the target gear somewhat less quickly, though more accurately. Regulation parameters can be modified for this purpose.

In block 47, the system checks whether the difference between the synchronization speed of the target gear and the rotational speed of the input shaft 11 is less than a second threshold value. If the result of the check is negative, block 47 is repeated until the result of the check is positive, and the control program is continued in block 48.

In block 48, the actuating device that actuates the sliding sleeves 28, 29, 30, 31 is activated in such a way that the sliding sleeve of the target gear is pushed onto the loose wheel of the target gear, the loose wheel thereby being connected in a rotationally fixed manner to the gearbox output shaft 27. The target gear is thus selected.

In block 49, the actuating device of the clutch 12 is activated in such a way that the clutch 12 is engaged. Moreover, the control device of the engine is made to abort regulation of the engine speed and to implement commands of the driver of the vehicle again.

In block 50, the control program is complete.

Figure 3:
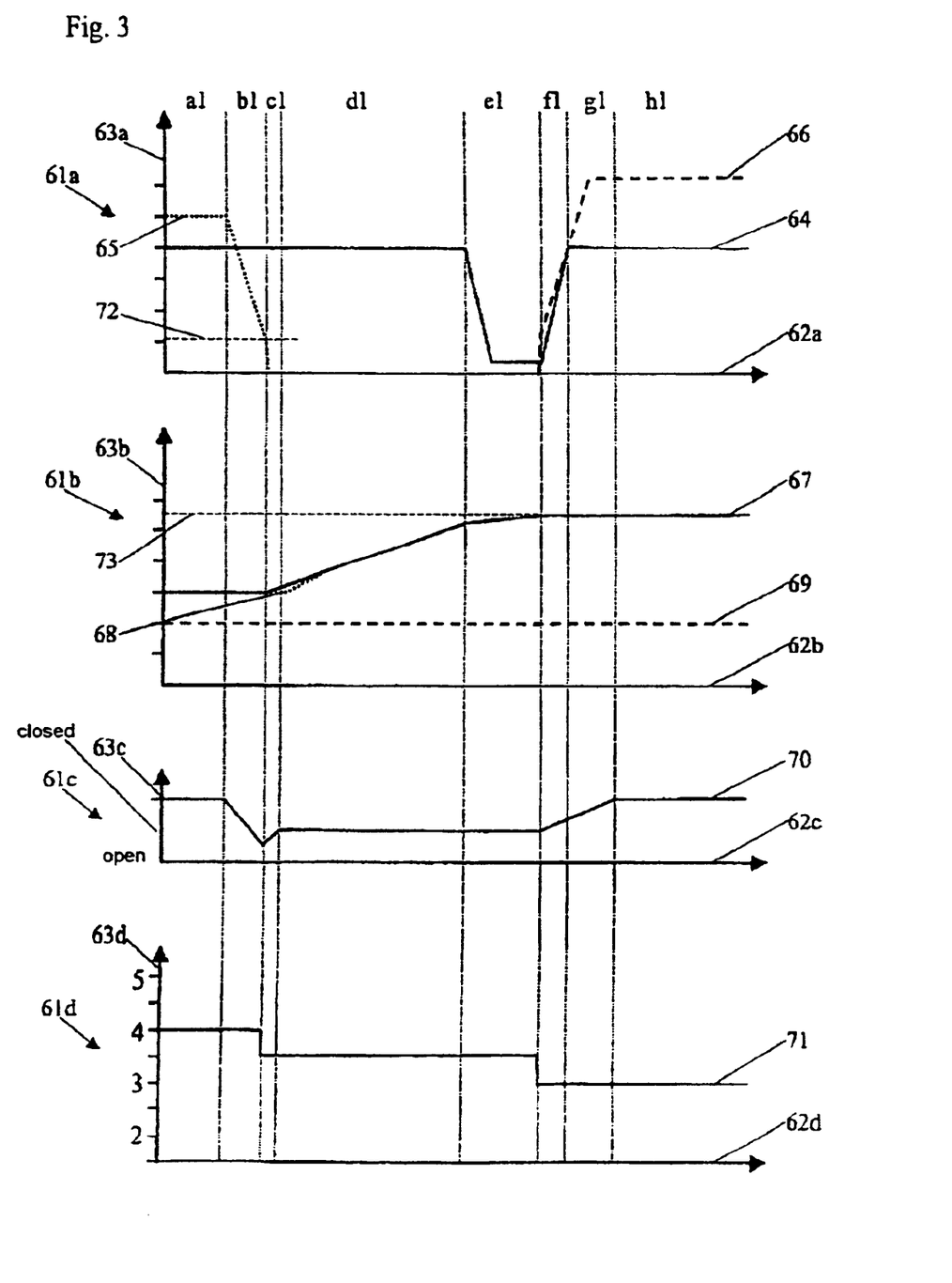
FIG. 3 shows a diagram that illustrates rotational speeds and torques with respect to time during a downshift in accordance with FIGS. 2a and 2b.

FIG. 3 shows a diagram intended to illustrate rotational speeds and torques with respect to time during a downshift from fourth to third gear in accordance with FIGS. 2a and 2b. Four systems of coordinates 61a, 61b, 61c and 61d are shown in the diagram. Time is plotted on the abscissas 62a, 62b, 62c and 62d in each case. Torques are plotted on ordinate 63a, rotational speeds are plotted on ordinate 63b, a degree of opening of the clutch 12 is plotted on ordinate 63c, and the selected gear is plotted on ordinate 63d.

In the system of coordinates 61a, the torque provided by the engine is represented as a continuous line 64, the torque transmitted between the sliding sleeve 29 and the loose wheel 24 of fourth gear is represented as a dotted line 65, and the torque transmitted between the sliding sleeve 29 and the loose wheel 23 of third gear is represented as a dashed line 66.

In the system of coordinates 61b, the rotational speed of the engine is represented as a continuous line 67, the rotational speed of the input shaft 11 is represented as a dotted line 68, and the rotational speed of the gearbox output shaft 27 is represented as a dashed line 69.

In the system of coordinates 61c, the degree of opening of the clutch 12 is illustrated as a continuous line 70. The degree of opening is between the two extreme values of "closed" in the engaged state and "open" in the disengaged state.

In the system of coordinates 61d, the gear selected is represented as a continuous line 71. The positions between two gears signify that no gear is selected and hence that no loose wheel is connected in a rotationally fixed manner to the gearbox output shaft 27. The change-speed gearbox 10 is thus in the neutral position.

All the characteristics are merely qualitative and are represented in a greatly simplified way.

Section a1 represents the state before the gear change. The engine is providing a maximum possible, constant torque, the rotational speeds of the engine and of the input shaft 11 are constant and equal, the clutch 12 is fully engaged and fourth gear is selected. Section b1 begins with the demand for a downshift to third gear. In section b1, the clutch 12 is disengaged by way of a ramp (line 70). As a result, the torque transmitted between sliding sleeve 29 and loose wheel 24 falls (line 65). At the beginning of section c1, this torque is less than the limiting value 72 (e.g. 20–60 Nm) and third gear is deselected (line 71), and the change-speed gearbox 10 is in neutral position. In section c1, virtually no torque is transmitted from the output shaft 13 to the input shaft 11. For this reason, the rotational speed of the engine is already increasing, whereas the rotational speed of the input shaft 11 remains the same. After the deselection of third gear, the clutch 12 is engaged up to the slip limit. At the beginning of section d1, this process is complete and the input shaft 11 is accelerated to the same rotational speed as the output shaft 13. The two rotational speeds are then increased very rapidly. Here, the gradient of the rotational speeds is limited only by the maximum torque available from the engine.

At the beginning of section e1, the difference between the synchronization speed 73 of third gear and the rotational speed of the input shaft 11 is less than a first threshold value (e.g. 30–300 rpm). In section e1, the torque provided by the engine is reduced in order to adjust the rotational speed of the input shaft 11 more slowly to the synchronization speed 73. At the beginning of section f1, the difference between the synchronization speed 73 and the rotational speed of the input shaft 11 is less than a second threshold value (e.g. 2–30 rpm) and third gear is selected. In this section, the torque provided by the engine is increased again. Owing to the selection of third gear and the increase in the torque, the torque transmitted between sliding sleeve 29 and loose wheel 23 of third gear rises abruptly and then continuously (line 66). Immediately after the selection of third gear, the clutch 12 begins to be engaged again. At the end of section g1, the clutch 12 is once again fully engaged. In section h1, the state following the gear change is illustrated. The rotational speed of the output shaft (line 69) remains virtually constant during the entire gear-change sequence (lasting, for example, 0.5–0.8 seconds).

Figure 4A:
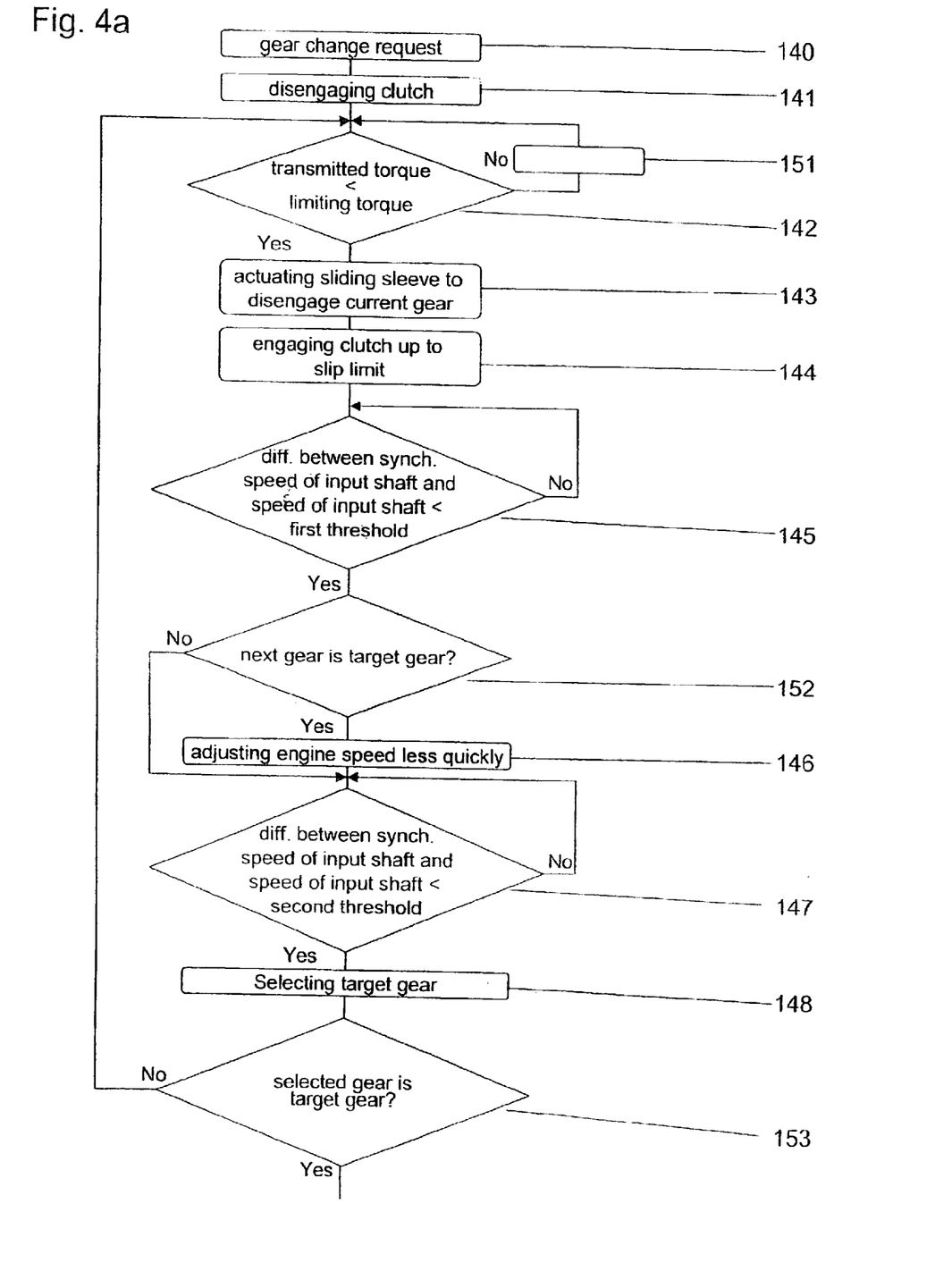
FIGS. 4a and 4b show a block diagram of a control program for a downshift from an original gear to a target gear involving the selection of intermediate gears.
Figure 4B:
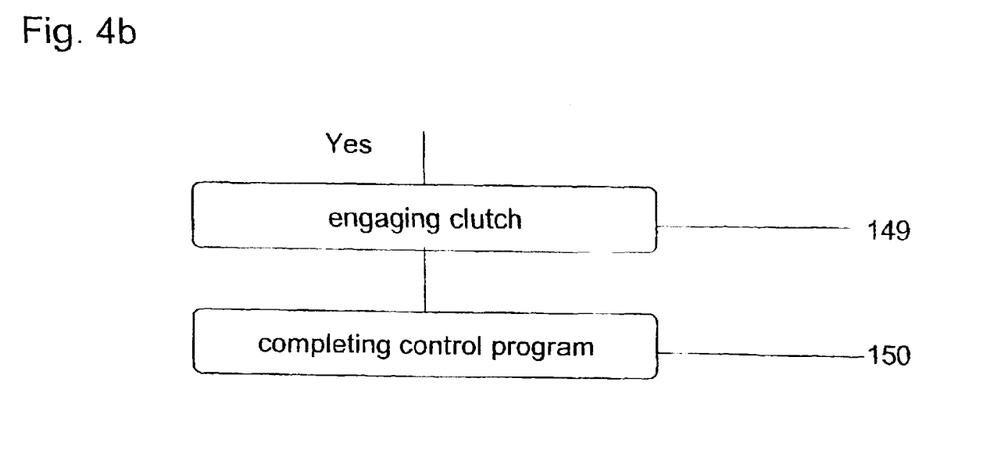

FIGS. 4a and 4b show a block diagram of a control program for a downshift from an original gear to a target gear involving the selection of intermediate gears.

The sequence of the control program is very similar to the sequence of the control program in FIGS. 2a and 2b. Identical or very similar blocks are provided with reference numerals incremented by 100 as compared with the reference numerals in FIGS. 2a and 2b.

After the start in block 140 due to a gear-change request for a downshift of more than one gear, the sequence does not differ from the sequence in FIGS. 2a and 2b until the block 145 has been executed.

FIG. 4a, block 145 is followed by a block 152, in which the system checks whether the next gear selected corresponds to the target gear. If the result of this check is negative, processing is continued in block 147. If the result of this check is positive, processing is continued in block 146. In block 146, the second phase of regulation of the rotational speed of the engine is started as in block 46 in FIG. 2a. As a departure from block 46, the actuating device of the clutch 12 is additionally activated to engage the clutch 12. Execution is then likewise continued in block 147.

Blocks 147 and 148 are executed in a manner similar to blocks 47 and 48 in FIG. 2b. In the following block 153, the system checks whether the gear selected in block 148 corresponds to the target gear. If the result of this check is positive, processing is continued in block 149. If the result of this check is negative, the program jumps back to block 142, in which the system checks whether the (intermediate) gear can be deselected. If the gear cannot be deselected, the clutch 12 is first of all disengaged further in block 151, and the check is then repeated in block 142. This loop is repeated until the result of the check is positive, and execution continues with block 143.

The loop between block 142 and block 153 is repeated until the target gear is selected and the result of the check in block 153 is hence positive.

In block 149, the control device of the engine is then made to abort regulation of the engine speed and to implement commands from the driver of the vehicle again. The control program is finished in block 150.

Figure 5:
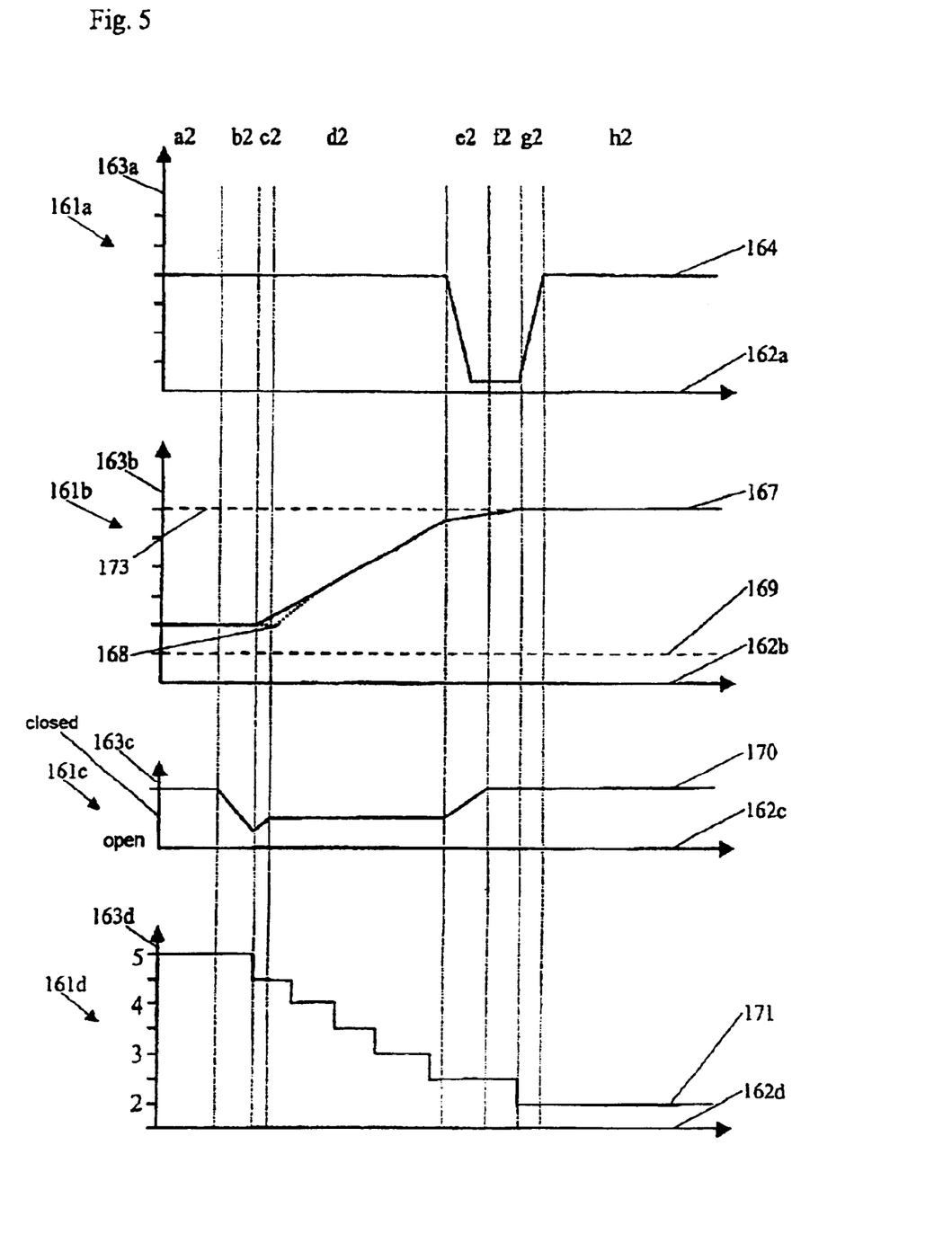
FIG. 5 shows a diagram that illustrates rotational speeds and torques with respect time during a downshift in accordance with FIGS. 4a and 4b.

FIG. 5 shows a diagram intended to illustrate rotational speeds and torques with respect to time during a downshift from fifth to second gear in accordance with FIGS. 4a and 4b. The illustration is very similar to the illustration in FIG. 3. Four systems of coordinates 161a, 161b, 161c and 161d, which have the same abscissas 162a, 162b, 162c and 162d and ordinates 163a, 163b, 163c and 163d as the corresponding systems of coordinates 61a, 61b, 61c and 61d in FIG. 3, are shown in the diagram. The variables illustrated in the systems of coordinates 161a, 161b, 161c and 161d likewise correspond to the variables in the systems of coordinates 61a, 61b, 61c and 61d in FIG. 3. All the characteristics are merely qualitative and are represented in a greatly simplified way.

Section a2 represents the state before the gear change. The engine is providing a maximum, constant torque and fifth gear is selected. The illustrations in sections b2 and c2 correspond to the illustrations in sections b1 and c1 in FIG. 3, with the distinction that the fifth gear is deselected in FIG.

5 (line 171). In section d2, the characteristics of the torque (line 164) and the rotational speed (line 167) of the engine and the rotational speed of the input shaft 11 (line 168) and the degree of opening of the clutch 12 (line 171) are fundamentally the same as the characteristics of the corresponding variables in FIG. 3. In contrast, the characteristic of the selected gear (line 171) differs in that all the (intermediate) gears (fourth and third gear) are sequentially selected and deselected again as fast as possible.

At the beginning of section e2, the difference between a synchronization speed 173 of the second gear and the rotational speed of the input shaft 11 is less than a first threshold value. In sections e2 and f2, the torque of the engine is reduced in order to adjust the rotational speed of the input shaft 11 more slowly to the synchronization speed 173. In addition, the clutch 12 is reengaged in section e2. At the beginning of section g2, the difference between the synchronization speed 73 and the rotational speed of the input shaft 11 is less than a second threshold value and the second gear (the target gear) is selected. In this section, the torque provided by the engine is increased again. In section h2, the state following the gear change is illustrated. The rotational speed of the output shaft (line 169) remains virtually constant during the entire gear-change sequence.

The method according to the invention can be employed with synchromesh and non-synchromesh change-speed gearboxes.

It is also possible for at least some of the loose wheels of the individual gears of the change-speed gearbox to be arranged on the layshaft.

If the engine is not already making available the maximum possible torque before or at the beginning of a downshift, the torque can be maintained or set to a different, preferably higher, value to accelerate the input shaft of the change-speed gearbox. The setting of a different value can take place abruptly, along a ramp or along a different predetermined characteristic.

When the original gear is deselected, the actuating device that actuates the sliding sleeves can be activated simultaneously with the opening of the clutch and simultaneously with the increasing of the rotational speed of the engine. Activation is performed in such a way that a force acts on the sliding sleeve, ensuring that the original gear is deselected as soon as this is possible due to the force that is acting. It is thus unnecessary to calculate the torque transmitted between the loose wheel and the sliding sleeve.

The setting of the rotational speed of the input shaft of the change-speed gearbox by the engine can also be performed by a control device of the change-speed gearbox sending a desired value for the torque provided by the engine to the control device of the engine. This means that regulation and/or control of the rotational speed is carried out by the control device of the change-speed gearbox.

The setting of the rotational speed of the input shaft of the change-speed gearbox to the synchronization speed of the target gear can also be performed in just one phase. The rotational speed can then be increased very rapidly during the entire setting process. Another possibility is to choose the characteristic values for setting, e.g. the parameters of a controller, in such a way that the rotational speed rises very rapidly at the beginning and the gradient decreases to an ever greater extent, the smaller the difference between the synchronization speed and the rotational speed of the input shaft.

The methods according to the invention can be employed not only with sequential change-speed gearboxes but also with change-speed gearboxes in which there is complete freedom of selection.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for changing gear in an automated change-speed gearbox of a motor vehicle with an automated clutch arranged between an engine and the change-speed gearbox, the method comprising:
    at least partially disengaging the clutch to deselect the original gear;
    adjusting a rotational speed of the engine in the direction of a synchronization speed of the target gear simultaneously with the disengagement of the clutch to deselect the original gear; and
    engaging the clutch up to a slip limit during a downshift from an original gear to a target gear to increase the rotational speed of an input shaft of the change-speed gearbox.

2. The method according to claim 1, wherein the step of at least partially disengaging the clutch is partially disengaging the clutch.

3. A method for changing gear in an automated change-speed gearbox of a motor vehicle with an automated clutch arranged between an engine and the change-speed gearbox, the method comprising:
    engaging the clutch up to a slip limit during a downshift from an original gear to a target gear to increase the rotational speed of an input shaft of the change-speed gearbox, wherein the change-speed gearbox includes a non-synchromesh shift gearbox.

4. A method for changing gear in an automated change-speed gearbox of a motor vehicle with an automated clutch arranged between an engine and the change-speed gearbox, the method comprising:
    engaging the clutch up to a slip limit during a downshift from an original gear to a target gear to increase the rotational speed of an input shaft of the change-speed gearbox, and adjusting, in two phases, the rotational speed of the input shaft of the change-speed gearbox into a range around the synchronization speed of the target gear.

5. The method according to claim 4, further comprising engaging the clutch beyond the slip limit after the adjustment of the rotational speed of the input shaft of the change-speed gearbox into a range around the synchronization speed of the target gear.

6. A method for changing gear in an automated change-speed gearbox of a motor vehicle with an automated clutch arranged between an engine and the change-speed gearbox, the method comprising:
    engaging the clutch up to a slip limit during a downshift from an original gear to a target gear to increase the rotational speed of an input shaft of the change-speed gearbox, wherein there is at least one intermediate gear between the original gear and the target gear.

7. The method according to claim 6, further comprising selecting the intermediate gear during the shift from the original gear to the target gear.

8. The method according to claim 7, further comprising actuating the clutch in the direction of disengagement to deselect the intermediate gear.

9. The method according to claim 8, further comprising adjusting the rotational speed of the input shaft of the change-speed gearbox into a range around the synchronization speed of the intermediate gear in just one phase.

10. A method for changing gear in an automated change-speed gearbox of a motor vehicle with just one automated clutch arranged between an engine and the change-speed gearbox, the method comprising:

at least partially disengaging the clutch to deselect an original gear; and adjusting a rotational speed of the engine in the direction of a synchronization speed of a target gear simultaneously with the disengagement of the clutch.

11. The method according to claim 10, wherein the change-speed gearbox includes a non-synchromesh shift gearbox.

12. The method according to claim 10, further comprising adjusting, in two phases, the rotational speed of the input shaft of the change-speed gearbox into a range around the synchronization speed of the target gear.

13. The method according to claim 12, further comprising engaging the clutch beyond the slip limit after the adjustment of the rotational speed of the input shaft of the change-speed gearbox into a range around the synchronization speed of the target gear.

14. The method according to claim 10, wherein there is at least one intermediate gear between the original gear and the target gear.

15. The method according to claim 14, further comprising selecting the intermediate gear during the shift from the original gear to the target gear.

16. The method according to claim 15, further comprising actuating the clutch in the direction of disengagement to deselect the intermediate gear.

17. The method according to claim 16, further comprising adjusting the rotational speed of the input shaft of the change-speed gearbox into a range around the synchronization speed of the intermediate gear in just one phase.

18. A system for controlling a downshift of an automated change-speed gearbox of a motor vehicle with an automated clutch arranged between an engine and the change-speed gearbox, the system comprising a clutch control device that at least partially disengages the clutch to deselect the original gear; adjusts a rotational speed of the engine in the direction of a synchronization speed of the target gear simultaneously with the disengagement of the clutch to deselect the original gear; and engages the clutch up to a slip limit during a downshift from an original gear to a target gear to increase the rotational speed of an input shaft of the change-speed gearbox.

* * * * *